Patented Nov. 14, 1944

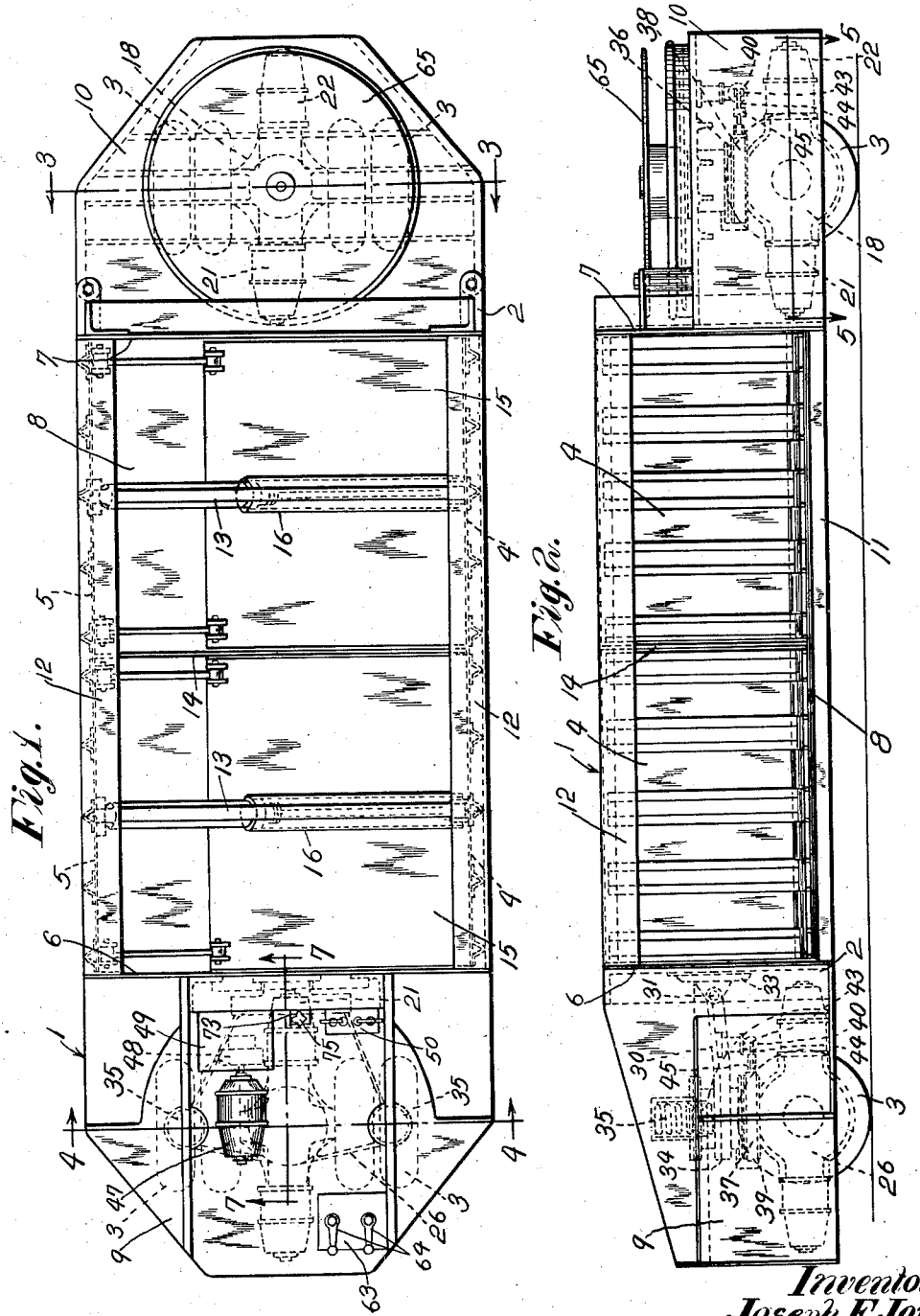

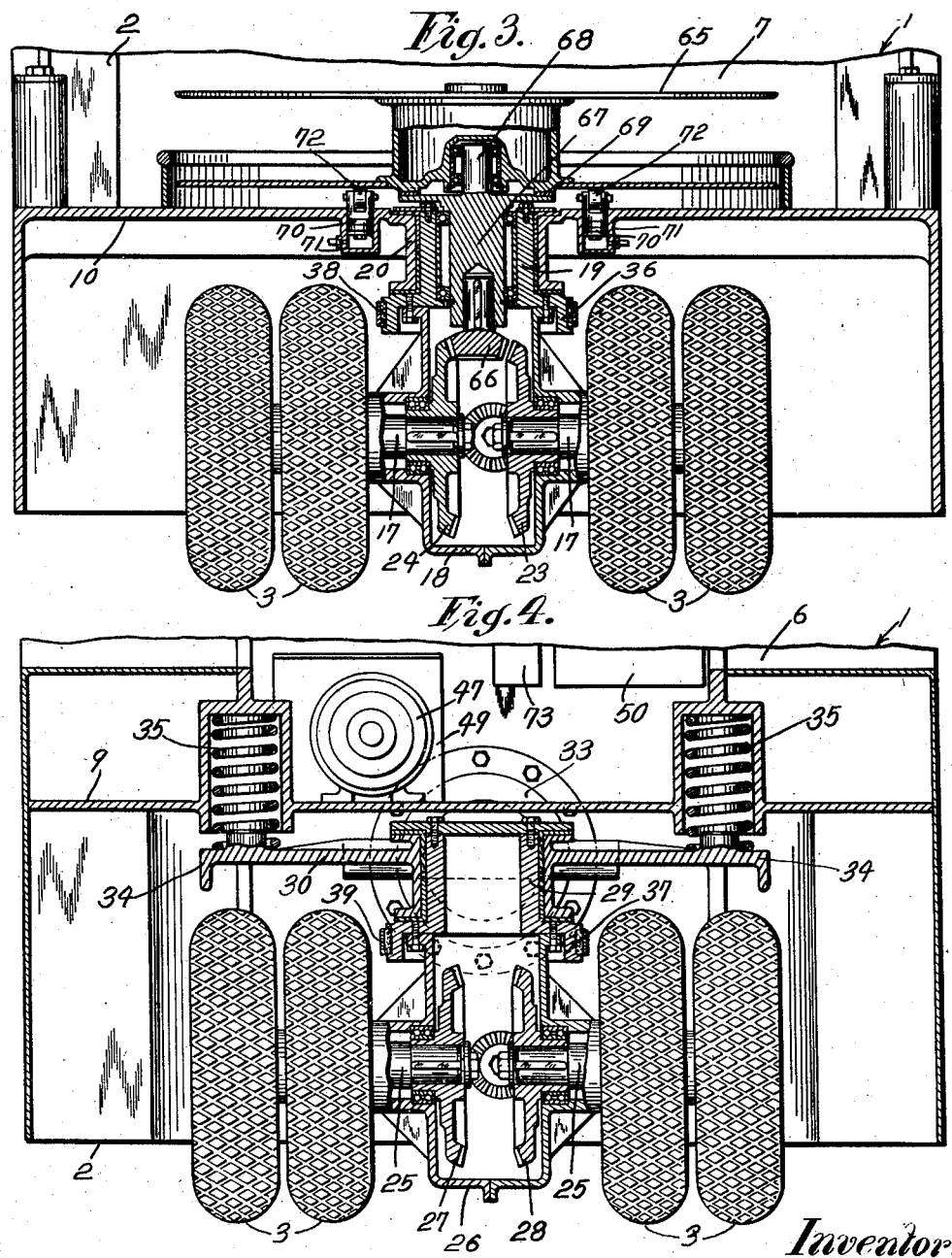

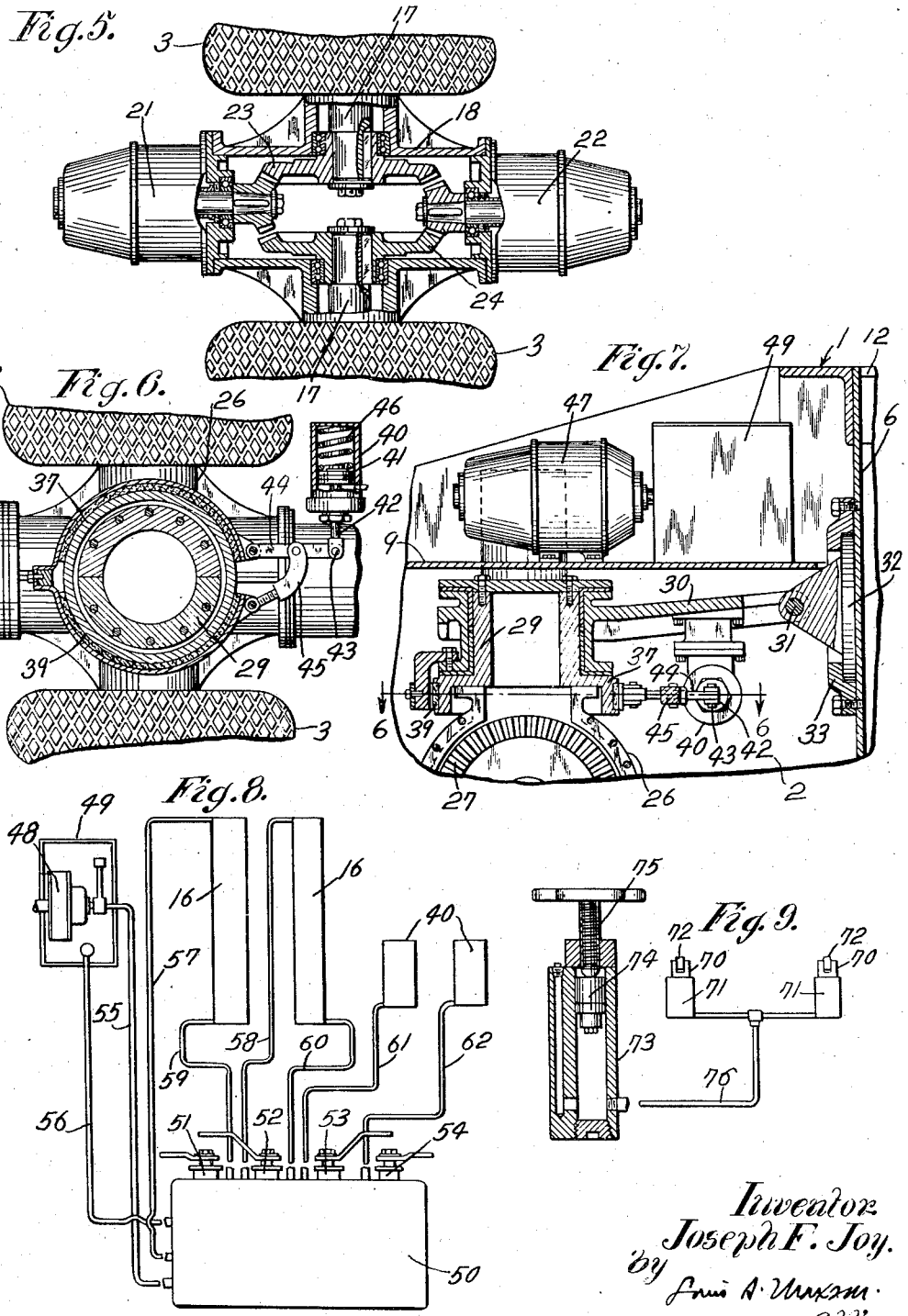

2,362,636

UNITED STATES PATENT OFFICE 2,362,636

MATERIAL TRANSPORT TRUCK

Joseph F. Joy, Washington, D. C., assignor to Sullivan Machinery Company, a corporation of Massachusetts Original application December 21, 1938, Serial No. 246,961. Divided and this application June 7, 1941, Serial No. 397,050

16 Claims. (Cl. 180—50)

This invention relates from one aspect to material transport trucks, and more particularly, but not exclusively, to an improved transport truck of the wheel-mounted, rubber-tired type especially designed for use in trackless mines. From another aspect it relates to propelling and steering mechanism for wheeled vehicles and to power supply means therefor.

An object of this invention is to provide an improved material transport truck. Another object is to provide an improved transport truck especially designed for use in mines. A further object is to provide an improved material transport truck of the wheel-mounted, rubber-tired type especially designed for use in trackless mines. A still further object is to provide an improved transport truck having improved propelling means and improved means for steering the truck whereby the truck may easily negotiate the relatively sharply curved passages in an underground mine. Yet another object is to provide an improved material transport truck of relatively large capacity for transporting the material from the working face of a mine, the truck being of relatively low overall height and mounted on rubber-tired wheels adapted to run directly over the mine floor, thereby eliminating the necessity of a mine trackway. Still a further object of the invention is to provide an improved propelling and steering mechanism for wheeled vehicles. Another object is to provide an improved cable reel mechanism for the power conductor cable of such a transport truck. Other objects and advantages of the invention will, however, hereinafter more fully appear.

This application is a division of my copending application Serial No. 246,961, filed December 21, 1938, now matured into Patent No. 2,284,661, granted June 2, 1942.

In the accompanying drawings there is shown for purposes of illustration one form which the invention may assume in practice.

In these drawings:

Fig. 1 is a top plan view of an illustrative form of the improved transport truck.

Fig. 2 is a side elevational view of the truck shown in Fig. 1.

Fig. 3 is an enlarged cross sectional view taken substantially on line 3—3 of Fig. 1.

Fig. 4 is an enlarged cross sectional view taken substantially on line 4—4 of Fig. 1.

Fig. 5 is an enlarged horizontal detail sectional view taken substantially on line 5—5 of Fig. 2.

Fig. 6 is a detail horizontal sectional view taken on line 6—6 of Fig. 7.

Fig. 7 is an enlarged, longitudinally extending, vertical sectional view taken substantially on line 7—7 of Fig. 1.

Fig. 8 is a diagrammatic view illustrating the hydraulic fluid system.

Fig. 9 is a diagrammatic view illustrating the hydraulic control means for the electric cable reel.

In this illustrative embodiment of the invention, there is shown a material transport truck, or so-called portable coal buggy, generally designated 1, herein of the wheel-mounted, rubber-tired type especially designed for use in trackless coal mines, and comprising a mine-car type truck body 2 mounted on transport wheels 3, the latter having pneumatic rubber tires of the conventional automotive type. The truck body is relatively low in height and generally rectangular in shape, and has vertical side walls 4 and 5, vertical end walls 6 and 7, and a horizontal bottom 8. The end walls are suitably rigidly secured to end frames 9 and 10, and extending longitudinally between these end frames and rigidly secured thereto are bottom frame members 11 for connecting the end frames and bracing the bottom plate 8. Also extending longitudinally of the truck at the opposite sides thereof near its top and rigidly secured in a suitable manner at their extremities to the upper portions of the vertical end walls 6 and 7, are rigid frame members 12 herein preferably in the form of angle irons. The side frame members 12 are laterally braced by transversely extending top frame members 13 preferably in the form of narrow cross bars secured at their extremities to the side frame members. Extending transversely of the truck body, midway between the end walls of the latter, is a vertical plate 14 providing a partition which separates the truck body into two material-receiving compartments 15, 15. The vertical plate 14 is suitably rigidly secured to the bottom plate 8 and the side frame members 12 in any suitable manner. As fully described in my copending application Serial No. 246,961, above referred to, sections of the side walls 4 and 5 of the truck body are pivotally mounted and may be swung about their pivots to effect discharge of the material from the compartments 15, 15 laterally from one side of the truck body, and hydraulic cylinders 16 are provided for swinging the side wall sections of the truck body to effect discharge of the material. As this material discharge means does not per se enter into the present invention, further description thereof is herein unnecessary.

In this illustrative construction, the rear truck wheels 3 are secured to alined axles 17, 17, respectively, herein suitably journaled within an axle housing 18 (Fig. 3). This housing is secured to an upstanding cylindric support 19 journaled for rotation on a vertical axis in bearing sleeves supported by a bearing support 20 formed integral with the end frame 10. Also mounted on the housing 18 are motors 21 and 22, herein preferably of the reversible electric type, having their power shafts respectively connected through bevel gearing 23, 24 to the truck wheel axles 17, 17, respectively, whereby the rear truck wheels may be independently driven. The front truck wheels 3 are secured to alined axles 25, 25, respectively, herein suitably journaled in an axle housing 26 (Fig. 4). Mounted on the housing 26 are motors, similar to the motors 21 and 22, having their power shafts connected through bevel gears to bevel gears 27 and 28, respectively, secured to the axles 25. The front axle housing 26 is secured to an upstanding cylindric member 29 journaled for rotation on an upright axis in bearing sleeves supported by a frame 30. As shown in Fig. 7, this frame 30 is pivotally connected at 31, for vertical swinging movement on a transverse axis, to a circular plate 32 in turn mounted in a bearing annulus 33 for rotation about a horizontal axis extending longitudinally of the truck. The pivotal axes are arranged in right angular relation, thereby to provide a universal pivotal mounting for the front housing 26, thereby to enable the truck wheels to move over an uneven floor without substantial tilting of the truck body. The pivoted frame 30 has lateral arms 34, and interposed between the front frame 9 and these arms are coil springs 35, these springs providing a yieldable shock absorbing connection between the axle housing and the truck body. Secured to the swivelled axle housings 18 and 26, respectively, are brake drums 36 and 37 with which brake bands 38 and 39 respectively cooperate. These brake bands when applied hold the axle frames 18 and 26 against swivelling movement on their upright axes relative to the truck body, and when either brake band is released one or the other of the housings 18, 26 may swing on its bearing about its upright axis to enable steering of the truck as it moves over the mine floor. Steering may be effected by independently or simultaneously driving the wheel driving motors in a manner simulating a tractor-tread drive whereby the wheels may be operated to effect steering of the truck through the drive thereof. The operating means for the brake bands 38 and 39 each comprise a cylinder 40 containing a reciprocable piston 41. The front brake cylinder is mounted on the frame 30 while the rear brake cylinder is mounted on the frame 10. Each piston has its piston rod 42 pivotally connected at 43 to a brake band operating lever 44. The lever 44 of each brake is pivotally connected at one end to the brake band while the other end of the brake band is connected by a link 45 to the lever 44, so that when the pistons 41 are moved inwardly in their cylinders against the action of coil springs 46, the brake bands may be applied through the lever and link 44, 45.

The means for supplying liquid under pressure to the cylinders 16 and 40 comprises a motor 47 (Figs. 1 and 7) mounted on the end frame section 9 at the forward end of the truck, and this motor has its power shaft connected to a conventional liquid pump 48 (see also Fig. 8) arranged within a liquid tank 49. Mounted on the end frame 9 is a valve box 50 having valve bores containing valves 51, 52, 53 and 54 of a conventional design. This valve box has usual intake and discharge passages connected through supply and discharge conduits 55 and 56 to the pump discharge and liquid tank respectively. The valve box bores containing the valves 51 and 52 are respectively connected by conduits 57 and 58 to the upper ends of the cylinders 16, while the lower ends of these cylinders are connected through conduits 59 and 60 to the valve bores respectively. By the provision of the independent valves for the cylinders 16, 16, the material in the compartments 15, 15 may be either independently or simultaneously discharged as desired, in the manner fully described in the copending application mentioned above. The valves 53 and 54 control the brake devices of the steering mechanism, and the means for operating the pistons 41 comprises conduits 61 and 62 extending from the bores containing the valves 53 and 54 respectively to the inner ends of the brake band operating cylinders 40. When the conduits 61, 62 are connected to the discharge passage of the valve box, the liquid within the cylinders 40 is released so that at that time the springs 46 act on the pistons 41 to move the latter to effect brake release. From the foregoing it is evident that either axle housing may be locked against swivelling movement with respect to the truck frame while the other axle housing may swing about its swivel mounting to effect steering of the truck, and, at certain times, both brakes may be released, either wholly or partially, to permit controlled swivelling of both axle housings, thereby to enable the truck to negotiate a relatively sharply curved mine passage. The motors driving the truck wheels, one individual to each wheel, are of the variable speed type and are controlled through a control box 63 mounted on the front frame member 9, in the manner shown in Fig. 1, and suitable control handles 64 are provided for independently controlling the wheel driving motors.

In this instance, mounted coaxially with the pivotal mounting for the rear axle housing 18 is an electric cable reel 65 arranged in a low compact horizontal position below the top of the truck body, and wound on this cable reel is the power conductor cable for the several motors. This cable reel may be driven in cable winding direction through a bevel gear 66 meshing with and driven by a bevel gear of the truck wheel driving means. As shown in Fig. 3, this bevel gear has a vertical stub shaft keyed to a vertical shaft 67 suitably journaled within the circular bearing support 19, and this shaft has an upstanding reduced portion 68 on which the cable reel is journaled. The cable reel may be driven by the shaft 67 through a friction ring 69. Hydraulically operated means are provided for elevating the reel 65 to interrupt its drive through the friction ring 69, comprising pistons 70 contained in vertical cylinders 71. The pistons have rollers 72 engaging the bottom plane surface of the cable reel, so that when liquid under pressure is supplied to the lower sides of the pistons the reel may be elevated axially to release its drive through the friction ring. When the cable reel is released from its drive, the cable thereon may be freely unwound from the reel, and when the reel is lowered by the pistons 70 into contact with the friction drive ring 69, the reel may be driven by the shaft 67 in a cable winding direction. The means for supplying liquid under pressure to the cylinders 71 comprises a cylinder block 73 mounted on the end frame 9 in adjacency to the valve box 50, as shown in Fig. 1. As shown in Fig. 9, contained in the cylinder block 73 is a plunger 74 operated by a hand screw 75. The lower end of the cylinder bore is connected through a conduit 76 to the lower ends of the cylinders 71, so that when the plunger 74 is moved downwardly by the hand screw 75, is moved downwardly by the hand screw 75, liquid under pressure is forced through the conduit 76 to the cylinders 71 at the lower sides of the pistons 70, thereby to raise the latter upwardly bodily to elevate the cable reel to disconnect its drive throught the friction ring 69. By trapping the liquid within the cylinder 73, the cable reel may be held in its elevated released position.

The mode of use of the improved transport truck will be clearly apparent from the description given. When the truck is located at the working face of a coal mine, the compartments 15, 15 of the truck body may be filled with the coal dislodged from the coal face, in any suitable manner, and when the truck is filled for transport the driving motors for the front and rear wheels 3 may be simultaneously driven to effect propulsion of the truck about the mine. Steering of the truck may be effected by interrupting drive through one or the other of the wheel driving motors under the control of the control apparatus 63, 64. During the steering operation, one or the other of the axle housings 18, 26 may be held against swivelling movement by application of one or the other of the brake bands 36, 37. When the transport truck reaches its destination, the coal contained in the truck body compartments 15, 15 may be discharged laterally from the side of the truck by supplying liquid under pressure, under the control of the valves 51, 52, to the cylinders 16, 16, thereby to effect swinging of the frame sections of the side walls into their coal discharging position, in the manner fully described in the above mentioned copending application. When the coal is completely discharged from the truck body compartments, liquid under pressure may be supplied to the opposite ends of the cylinders 16, thereby to move the pivoted sections of the frame side walls back to their initial position. The universal pivotal spring mounting for the front axle housing 26 enables the truck to move over an uneven mine floor without substantial tilting of the truck body, consequently preventing undue distortion of the frame parts. As the truck moves in one direction, the cable reel 65 may be operated to pay out the power conductor cable, and when the truck moves in the opposite direction, the cable reel may be operated to wind in the conductor cable by power. When the cable reel is elevated by the hydraulic cylinders, the cable reel drive will be interrupted, and at that time the cable reel may freely rotate.

As a result of this invention it will be noted that an improved material transport truck is provided which is not only of relatively large capacity but is also low in height, a feature of considerable importance when the truck is operating in a mine having relatively low head room. It will further be noted that by the provision of the truck wheels provided with pneumatic rubber tires engageable directly with the mine floor, the improved truck may operate without the use of a mine trackway, thereby increasing freedom of movement of the truck while at the same time the cost of laying tracks throughout the mine is eliminated. It will further be evident that by the provision of the improved wheel driving means including the independently operable wheel driving motors, the motor control means, and the axle housing brakes, the truck may be propelled about the mine and steered through the relatively sharply curved mine passages in an improved manner. Other uses and advantages of the invention will be clearly apparent to those skilled in the art, and it will be apparent that though this invention in its specific embodiment is illustrated incorporated in a material transport truck, in its broader aspects it relates to propelling and steering mechanism for wheeled vehicles without limitation as to type or field of use, and may be embodied in cutting machines as well as transport devices, or used in transportation generally without restriction to the field of mining.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. A material transport truck comprising, in combination, a truck body, pairs of front and rear traction wheels for supporting said truck body, axle housings swivelled to swing independently relative to said truck body about upright axes, frictional brake means for independently yieldingly frictionally locking said axle housings against swinging movement about their pivotal axes and releasable to permit free swinging of said axle housings, and control means operable at will during travel of the truck for controlling said brake means, thereby to control swivelling of said axle housings and steering of the truck.

2. A material transport truck comprising, in combination, a truck body, pairs of front and rear traction wheels for supporting said truck body, axle housings swivelled to swing independently relative to said truck body about upright axes, means for independently driving said wheels of both pairs to effect propulsion and steering of the truck, frictional brake means for independently yieldingly frictionally locking said axle housings against swinging movement about their pivotal axes and releasable to permit free swinging of said axle housings, and control means operable at will during travel of the truck for controlling said brake means, thereby to control swivelling of said axle housings and steering of the truck.

3. In a material transport truck, in combination, a truck body, and running gear for said body including a plurality of wheels and swivelled mounting means for said wheels comprising an axle housing swivelled to turn about a vertical axis and means pivotally connecting said swivelled axle housing to said truck body and pivotally connected to the latter to swing relative thereto about rectangularly related axes distinct from the swivel axis of said housing.

4. In a truck, in combination, a truck body, and running gear for said body including a plurality of wheels and swivelled mounting means for said wheels including an axle housing swivelled to turn about a vertical axis and a frame movable in a vertical direction relative to the truck body about a transverse axis and pivotally connected to said truck body on a longitudinal axis, said axle housing being swivelled on said vertically swingable frame.

5. A truck comprising, in combination, a truck body, and supporting means therefor including swivelled wheel mounting means including an axle housing swivelled to turn about a vertical axis, a frame pivotally connected to said truck body to swing in a vertical direction on a horizontal transversely extending axis and on which said axle housing is swivelled, and traction wheels having axles journaled in said axle housing.

6. A truck comprising, in combination, a truck body, and supporting means therefor including swivelled wheel mounting means including an axle housing swivelled to turn about a vertical axis, a frame pivoted to swing in a vertical direction on a horizontal transversely extending axis and on which said axle housing is swivelled, a frame pivotally connected to said truck body to turn on a longitudinal axis and to which said vertically swingable frame is pivotally connected, and traction wheels having axles journaled in said axle housing.

7. A truck comprising, in combination, a truck body, and supporting means therefor, swivelled wheel mounting means including an axle housing swivelled to turn about a vertical axis, a frame pivotally connected to said truck body to swing in a vertical direction on a horizontal transversely extending axis and on which said axle housing is swivelled, said frame having laterally projecting arms and resilient buffers between said arms and said truck body, and traction wheels having axles journaled in said axle housing.

8. In a truck, a truck body, supporting wheels therefor including pairs of front and rear steering and propelling wheels, said pairs of wheels swivelled to turn independently about vertical axes, driving motors, one individual to each wheel, for effecting propulsion of the truck, means for independently controlling said motors to effect swivelling of said wheels, thereby to steer the truck, releasible friction brake devices for yieldingly resisting swivelling movement of said wheels, and control means operable at will during traveling of the truck to effect application and release of said brake devices, thereby to control swivelling of said wheels and steering of the truck.

9. In a truck, a truck body, supporting wheels therefor including pairs of front and rear steering and propelling wheels, said pairs of wheels swivelled to turn independently about vertical axes, driving motors, one individual to each wheel, for effecting propulsion of the truck, means for independently controlling said motors to effect swivelling of said wheels, thereby to steer the truck, releasible friction brake devices for yieldingly resisting swivelling movement of said wheels, anad means operable at will during traveling of the truck for independently or concurrently controlling said friction brake devices, thereby to control swivelling of the wheels and steering of the truck.

10. In a truck, the combination comprising a truck body, supporting and propulsion means for said body including propelling means for said body including a swivelled housing, motor means for driving said propelling means, a cable reel having a power conductor cable wound thereon for conducting power to said motor means, and driving connections between an element of said propelling means and said reel, said driving connections extending through the swivel for said housing.

11. In a truck, the combination comprising a truck body, supporting and propulsion means for said body including propelling means for said body including a swivelled housing, motor means for driving said propelling means, a cable reel having a power conductor cable wound thereon for conducting power to said motor means, driving connections between an element of said propelling means and said reel, said driving connections extending through the swivel for said housing, and means for disconnecting said reel from its driving connections.

12. A truck comprising, in combination, a truck body, traction means for supporting and propelling said truck body, front and rear axle housings for said traction means, said axle housings swivelled to swing independently relative to said truck body about vertical axes, frictional brake means for said axle housings respectively for independently yieldingly resisting swinging movement of said axle housings and for holding said axle housings against swinging movement, and control means operable at will during traveling of the truck to effect application and release of said brake means, thereby to control swivelling of said axle housings and steering of the truck.

13. A truck comprising, in combination, a truck body, traction means for supporting and propelling said truck body, front and rear axle housings for said traction means, said axle housings swivelled to swing independently relatively to said truck body about vertical axes, means for independently driving said traction means to effect propulsion and steering of the truck, frictional brake means for said axle housings respectively for independently yieldingly resisting swinging movement of said axle housings and for holding said axle housings against swinging movement, and control means operable at will during travelling of the truck to effect application and release of said brake means, thereby to control swivelling of said axle housings and steering of the truck.

14. A truck comprising, in combination, a truck body, supporting wheels for said truck body comprising pairs of front and rear traction wheels, an axle housing for each pair of wheels, said axle housings swivelled to turn independently about upright axles relative to the truck body, motor means for independently driving said traction wheels, frictional brake means for independently frictionally controlling swinging movement of said axle housings and for yieldingly holding said axle housings against swinging movement, and control means operable at will during traveling of the truck to effect application and release of said brake means, thereby to control swivelling of said axle housings and steering of the truck.

15. A truck comprising, in combination, a truck body, and running gear therefor including a plurality of wheels and swivelled mounting means for said wheels including a swivelled axle housing, a frame connected to said truck body on a longitudinal axis and to which said axle housing is swivelly connected, said frame having laterally projecting arms, and resilient buffers between said arms and said truck body.

16. In a truck, the combination comprising a truck body, running gear therefor including a plurality of supporting wheels, swivelled mounting means for said wheels comprising a swivelled housing, a cable reel having a power conductor cable wound thereon, and driving means for said reel including driving connections extending through the swivel of said housing.

JOSEPH F. JOY.

CERTIFICATE OF CORRECTION.

Patent No. 2,362,636. November 14, 1944.

JOSEPH F. JOY.

It is hereby certified that error appears in the printed specification of the above numbered patent requiring correction as follows: Page 3, first column, line 4, for "throught" read --through--; page 4, first column, line 53, claim 9, for "anad" read --and--; and second column, line 27, claim 13, for "relatively" read --relative--; line 45, claim 14, for "axles" read --axes--; and that the said Letters Patent should be read with this correction therein that the same may conform to the record of the case in the Patent Office.

Signed and sealed this 20th day of March, A. D. 1945.

Leslie Frazer (Seal) Acting Commissioner of Patents.